United States Patent

Kim

[11] Patent Number: 5,963,249
[45] Date of Patent: Oct. 5, 1999

[54] SELF-DIAGNOSTIC CIRCUIT FOR A VIDEO DISPLAY AND METHOD OF IMPLEMENTING THE SAME

[75] Inventor: Young-hee Kim, Suwon, Rep. of Korea

[73] Assignee: SamSung Electronics Co., Ltd., Kyungki-do, Rep. of Korea

[21] Appl. No.: 08/668,121

[22] Filed: Jun. 14, 1996

[30] Foreign Application Priority Data

Jun. 14, 1995 [KR] Rep. of Korea ...................... 95-15719

[51] Int. Cl.⁶ .................................................. H04N 17/00
[52] U.S. Cl. .......................................... 348/178; 348/189
[58] Field of Search .................................... 348/181, 182, 348/189, 190, 177, 178; 324/76.52, 76.53, 76.61, 76.77; 371/21.1, 21.2, 21.3; 365/201; 364/570, 580, 487; H04N 17/00

[56] References Cited

U.S. PATENT DOCUMENTS

| | | | |
|---|---|---|---|
| 4,459,551 | 7/1984 | Yakamovitz | 348/189 |
| 4,538,268 | 8/1985 | Pham Van Cang | 358/10 |
| 4,894,718 | 1/1990 | Hung | 358/139 |
| 5,055,928 | 10/1991 | Klingelhofer | 358/139 |
| 5,077,600 | 12/1991 | Ichigaya et al. | 358/10 |
| 5,319,446 | 6/1994 | Emmoto et al. | 348/181 |
| 5,343,242 | 8/1994 | Rowsell et al. | 348/181 |
| 5,442,391 | 8/1995 | Hung et al. | 348/190 |
| 5,526,043 | 6/1996 | Wen | 348/190 |
| 5,631,698 | 5/1997 | Lee | 348/178 |

FOREIGN PATENT DOCUMENTS

| | | | |
|---|---|---|---|
| 363072577 | 4/1988 | Japan | B41J 29/46 |
| 404195235 | 7/1992 | Japan | G06F 12/16 |

*Primary Examiner*—Michael H. Lee
*Attorney, Agent, or Firm*—Robert E. Bushnell, Esq.

[57] ABSTRACT

A self-diagnostic circuit and method for implementing the same for use with a video display device to conduct a self-diagnostic test of respective hardware components such as a ROM, RAM and EEPROM within the video display device using a built-in microprocessor. The circuit allows a video display device to perform a diagnostic test on its individual hardware components within a tested video display device and to inform an operator of any malfunction thereof.

15 Claims, 4 Drawing Sheets

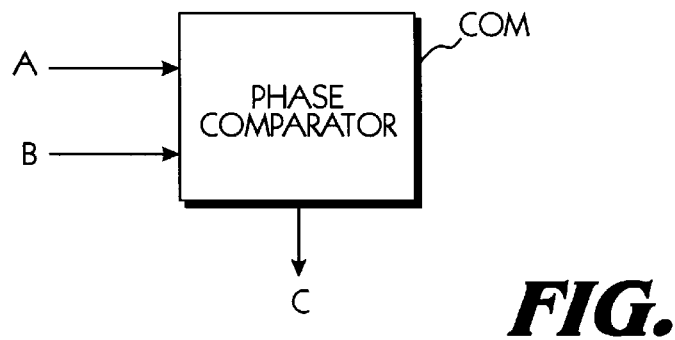
FIG. 2
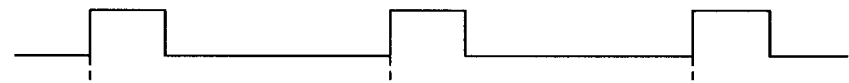
FIG. 3A
FIG. 3B
FIG. 3C
FIG. 4

SELF-DIAGNOSTIC CIRCUIT FOR A VIDEO DISPLAY AND METHOD OF IMPLEMENTING THE SAME

CROSS-REFERENCE TO RELATED APPLICATION

This application makes reference to, incorporates the same herein, and claims all benefits accruing under 35 U.S.C. §119 from an application for Self-Diagnosic Circuit For A Video Display And Method Of Implementing The Same earlier filed in the Korean Industrial Property Office on Jun. 14, 1995, and there duly assigned Serial No. 95-15719.

BACKGROUND OF THE INVENTION

1. Technical Field

The present invention relates to a self-diagnosis circuit for use in a video display system, and more particularly, to a self-diagnostic circuit for performing self-diagnostic testing of specific electronic subsystem components within a video display system and method of implementing the same.

2. Background Art

Generally, a video display device such as a cathode ray tube (CRT) monitor for a personal computer or a television set must be tested and adjusted to its various geometrical and optical deviations and distortions for quality control on a production line. Functional parameters of the CRT displays must sometimes be preset according to buyers' requirements and the scanning dimensions on a display must be regulated to be smaller or larger than the actual size of a display if functional features are set in advance.

Traditionally, to conduct such a performance test on the CRT displays such as disclosed in U.S. Pat. No. 4,538,268 for Test-Signal Generating Device For Testing Electronic Equipment issued to Cang, a number of standard full-field video test signals in a form of geometric diagrams must first be input into the monitors so that an operator can inspect if the diagrams are distorted. If the diagrams are distorted, an operator must adjust the horizontal and vertical lines on a monitor until the diagram on the monitor is adjusted into a normal one. The video test signals may be generated by a conventional video display test pattern signal generator such as disclosed in U.S. Pat. No. 5,319,446 for Test Pattern Signal Generator issued to Emmoto. All such operations are, however, tedious and time consuming, and must be carried out manually by an operator on a production line.

More recent video display testing systems such as disclosed in U.S. Pat. No. 5,442,391 for Method And System For Testing A Cathode Ray Tube Or Like Products issued to Hung et al., use electronic cameras in lieu of an operator to read the standard test pattern from the screen of a test CRT video displays for a computer to adjust functional parameters of the tested CRT display. However, such video display testing systems are relatively bulky and inconvenient to operate. Other attempts to test CRT video displays are disclosed in U.S. Pat. No. 5,343,242 for Testing Video Equipment issued to Rowsell et al., in which external testing equipments such as oscilloscopes, signal analyzers or voltage/current measuring instruments are used to test the operational status of individual subsystem components within a CRT video display. Consequently, the conventional video display testing equipments used to test an operational status of each individual hardware components within a tested CRT video display are either unnecessarily complicated and expensive or require time consuming manual participation from an operator on a production line.

One recent video display testing system that represents a notable improvement over the traditional manual video display testing technique and the more elaborated computerized video display testing technique is disclosed in U.S. Pat. No. 5,526,043 for Automatic Video Display Testing And Adjusting System issued to Wen. In Wen '043, the automatic video display testing system is made up of a transparent mask, a main circuit board fixed to a CRT video display, a plurality of adjustable sensor mounting members to each of which is secured a sensor, and a computer system connected to the main circuit board by cable and having an operation program used for testing and automatically adjusting a CRT video display. The operation program is used to perform the testing and adjusting without manual interference as long as the transparent mask is mounted on a CRT video display with all the sensors accurately placed on a surface of a tested CRT video display for sensing a scanning light on a CRT video display in test. The automatic video display testing system of Wen '043 is, however, not capable of testing individual hardware components within a tested CRT video display. Accordingly, I believe that further improvement can be contemplated for the testing of individual hardware components within a CRT video display.

SUMMARY OF THE INVENTION

It is therefore an object of the present invention to provide a self-diagnostic circuit in a video display device for testing an operational status of each individual hardware components within the video display device.

It is another object to provide a self-diagnostic circuit built-in a video display device using a microprocessor for operating a self-diagnostic program stored therein and transmitting resultant data of a self-diagnostic test to either a personal computer or an external measuring instrument to allow an operator to determine whether any individual hardware components within the video display device is abnormal or malfunction.

It is yet another object to provide a self-diagnostic method of a video display device for testing an operational status of each memory device, i.e., a read-only-memory (ROM), a random-access-memory (RAM) and an electrically erasable programmable read-only-memory (EEPROM) included in a microprocessor.

These and other objects may be achieved by a self-diagnostic circuit for use in a video display device for performing a self-diagnostic test on each hardware components within a tested video display device. The self-diagnostic circuit includes a video preamplifier and phase-locked loop (PLL) circuit for comparing a composite video signal as applied to a cathode-ray tube (CRT) with an external composite video signal received from an external host computer or an image processing system through a cable connector connected to a cable, detecting a phase-difference therebetween and then generating a first phase-difference signal representing a phase difference between the respective composite video signals. A video main amplifier is connected to the video preamplifier and phase-locked loop (PLL) circuit to amplify the composite video signal. A first signal shaping portion is connected to the video main amplifier to shape a waveform of the amplified composite video signal as applied to the cathode-ray tube (CRT) and to feed the shaped composite video signal back to the video preamplifier and phase-locked loop (PLL) circuit. A horizontal oscillation and phase-locked loop (PLL) circuit is connected to the cable connector to compare a horizontal synchronization signal as applied to a cathode-ray tube (CRT) with an input horizontal synchronization signal as supplied from the external host computer or the image processing system, to detect a phase-difference therebetween and then generate a second phase-difference signal representing a phase difference between the respective horizontal synchronization signals. A horizontal output circuit is connected to the horizontal oscillation and phase-locked loop (PLL) circuit to generate the horizontal synchronization signal to be applied to a cathode-ray tube (CRT). A second signal shaping portion is connected to the horizontal output circuit to shape a waveform of the horizontal synchronization signal signal as applied to the cathode-ray tube (CRT) and to feed the shaped horizontal synchronization signal back to the horizontal oscillation and phase-locked loop (PLL) circuit. A vertical oscillation and phase-locked loop (PLL) circuit is connected to the cable connector to compare a vertical synchronization signal as applied to the cathode-ray tube (CRT) with a vertical synchronization signal as supplied from the external host computer or the image processing system, to detect a phase difference therebetween, and then generate a third phase-difference signal representing a phase difference between the respective vertical synchronization signals. A vertical output circuit is connected to the vertical oscillation and phase-locked loop (PLL) circuit to generate the vertical synchronization signal to be applied to the cathode-ray tube (CRT). A third signal shaping portion is connected to the vertical output circuit to shape a waveform of the vertical synchronization signal as applied to the cathode-ray tube (CRT) and to feed the shaped vertical synchronization signal back to the vertical oscillation and phase-locked loop (PLL) circuit. A fourth signal shaping portion is used to shape respective voltage levels generated from a switching mode power supply (SMPS) which provides driving power supply to respective memory circuits incorporated in a video display device.

A microprocessor including an analog-to-digital (A/D) converter and memory devices such as a read-only-memory (ROM), a random-access-memory (RAM) and an erasable programmable read-only-memory (EEPROM) is electrically connected to the cable connector, the video preamplifier and phase-locked loop (PLL) circuit, the horizontal oscillation and phase-locked loop (PLL) circuit, and the vertical oscillation and phase-locked loop (PLL) circuit for receiving the vertical and horizontal synchronization signals from an external host computer or an image processing system, the first, second and third phase-difference signals, and the respective voltage levels supplied from the switching mode power supply (SMPS) 90 in order to determine an abnormal operational status of each internal memory circuit and to transmit such operational status information to an external host computer or an image processing system for informing an operator whether such internal memory circuit is functioning properly.

Each of the video preamplifier and phase-locked loop (PLL) circuit, the horizontal oscillation and phase-locked loop (PLL) circuit and the vertical oscillation and phase-locked loop (PLL) circuit as constructed according to the principles of the present invention contains at least one phase comparator for comparing the phase difference between respective input signals. The analog-to-digital (AID) converter of the microprocessor may be constructed as an input/output device for converting the first, second, third phase-difference signals into a digital format for performing a self-diagnostic test on each built-in memory devices such as the ROM, RAM and EEPROM contained in the microprocessor. In addition, at least one digital-to-analog converter is incorporated in the respective video preamplifier and phase-locked loop (PLL) circuit, the horizontal oscillation and phase-locked loop (PLL) circuit and the vertical oscillation and phase-locked loop (PLL) circuit so that an output gain generated therefrom is able to be transmitted therethrough. In order to transmit and receive data from the respective video preamplifier and phase-locked loop (PLL) circuit, the horizontal oscillation and phase-locked loop (PLL) circuit and the vertical oscillation and phase-locked loop (PLL) circuit, a data format of single frame consisting of a start condition field, a slave address field, a read/write field, a first data acknowledge field, a first data field, a second data acknowledge field, a second data field, a data field and a stop condition field is used.

The self-diagnostic testing of individual hardware components such as a read-only-memory (ROM) of the microprocessor built-in a video display device such as a CRT display as contemplated by the present invention can be achieved by three different stages: in the first stage, a predetermined value is set to correspond to a total sum of data stored in every dedicated address area of the ROM; in the second stage, a sum total is generated by adding up values of data stored in the dedicated address area of the ROM from the initial address up to the last address; and in the third stage, the sum total is then determined whether it corresponds to the predetermined value so that a resultant so determined is available for transmission to an external host computer or an image processing system for a visual display to inform an operator of an operational status of a tested hardware component within the video display device. When the sum total corresponds to the predetermined value, it is determined that the dedicated address area of the ROM is in good operational status and a data signal responsive to the resultant is applied to a cable connector for transmission to the external host computer to inform an operator of such operational status. When the sum total does not correspond to the predetermined value however, it is determined that the dedicated address area of the ROM is not in good operational status and a data signal responsive thereto is applied to the cable connector for transmission to the external host computer to inform an operator of such malfunction status. The predetermined value set as described is either a logic "0" or a logic "1".

The self-diagnostic testing of individual hardware components such as a random-access-memory (RAM) or an erasable programmable read-only-memory (EEPROM) of the microprocessor built-in a video display device such as a CRT display as contemplated by the present invention can be achieved by three different stages: in the first stage, predetermined data is written into an address allocated in a reserved area of one of a RAM and an EEPROM and the stored data from the address area is then read out for a comparison with the predetermined data to determine an operational status of the address area; in the second stage, when the stored data read from the address area corresponds to the predetermined data, then the first stage is repeated in discrete increment until the last address in one of the RAM and the EEPROM is reached; and finally in the third stage, when the address area in one of the RAM and the EEPROM is determined to be in good operational status for proper operation after each comparison result in discrete increment indicates equivalency, an operational status signal is transmitted to an external host computer or an image processing system through the cable connector to inform an operator that a tested hardware component is in good operational status. When the address area in one of the RAM and the EEPROM is determined to be malfunctional if such comparison result in discrete increment does not indicate equivalency, however, then an operational status signal is transmitted to the external host computer or the image processing system through the cable connector to inform an operator that a tested hardware component is in malfunctional status.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 2 is a schematic block diagram of a typical phase comparator for use in a video preamplifier and phase-locked loop circuit 20, a horizontal oscillation and phase-locked loop circuit 50 and a vertical oscillation and phase-locked loop circuit 70 of the self-diagnostic circuit as shown inFIG. 1;

FIG. 3 illustrates waveforms of respective input signals and an output phase-difference signal generated by the phase comparator as shown in FIG. 2;

FIG. 4 illustrates a format of single data frame for data transmission constructed according to the principles of the present invention;

DETAILED DESCRIPTION OF THE PREFERRED EMBODIMENT

Figure 1:
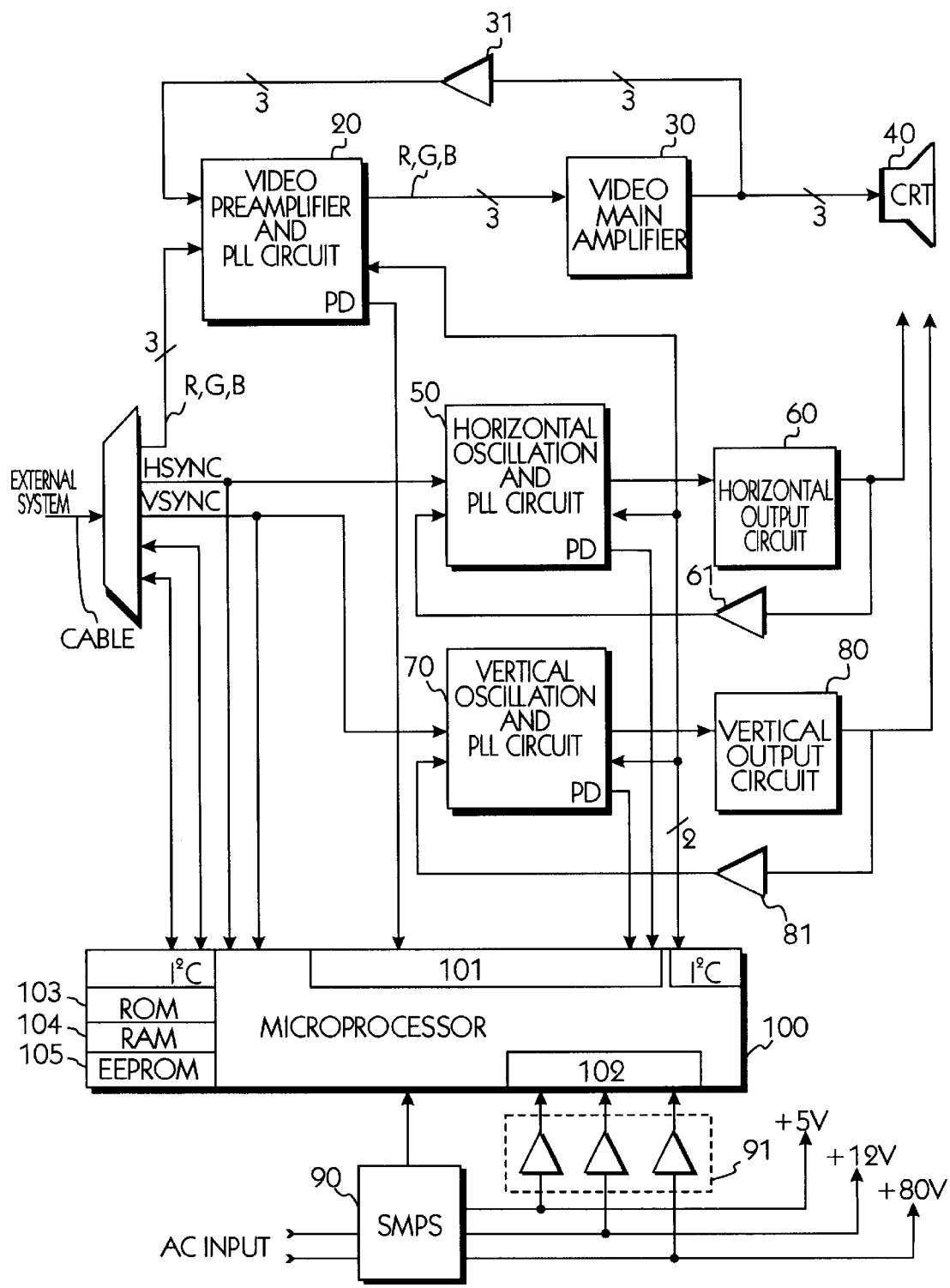
FIG. 1 is a block diagram illustrating a self-diagnostic circuit constructed according to the principles of the present invention.

Referring now to the drawings and particularly to FIG. 1, which illustrates a self-diagnostic circuit for self-diagnosis in a video display device constructed according to the principles of the present invention. The self-diagnostic circuit of a video display device as shown in FIG. 1 includes a cable connector 10 connectable to an external host computer or an image processing system (not shown) by a cable a video preamplifier and phase-locked loop (PLL) circuit 20, a video main amplifier 30, a first signal shaping portion 31, a cathode-ray tube (CRT) 40, a horizontal oscillation and phase-locked loop (PLL) circuit 50, a horizontal output circuit 60, a second signal shaping portion 61, a vertical oscillation and phase-locked loop (PLL) circuit 70, a vertical output circuit 80, a third signal shaping portion 81, a switching mode power supply 90, a fourth signal shaping portion 91, and a microprocessor 100. The microprocessor 100, with its associated analog-to-digital (A/D) converter 101, input/output device 102, and memory devices such as a read-only-memory (ROM) 103, a random-access-memory (RAM) 104 and an erasable programmable read-only-memory (EEPROM) 105, performs the self-diagnostic testing of internal hardware components of a video display device such as a ROM, RAM and EEPROM as well as the respective video preamplifier and phase-locked loop (PLL) circuit 20, the horizontal oscillation and phase-locked loop (PLL) circuit 50 and the vertical oscillation and phase-locked loop (PLL) circuit 70.

A cable connector 10 is connected to an external host computer or an image processing system through a cable to receive a composite video signal consisting of red, green, and blue R, G, B video components and a horizontal and vertical synchronization signals HSYNC and VSYNC from the external host computer. The video preamplifier and phase-locked loop (PLL) circuit 20 is connected to the cable connector 10 to receive an external composite video signal received from an external host computer or an image processing system through the cable connector 10 and compare the external composite video signal with a feedback composite video signal consisting of R, G, B video components as applied to a cathode-ray tube (CRT) 40 in order to detect a phase-difference therebetween the respective composite video signals and generate, at its phase-difference output terminal PD, a first phase-difference signal representing a phase difference between the respective composite video signals.

A video main amplifier 30 is connected to the video preamplifier and phase-locked loop (PLL) circuit 20 to amplify the composite video signal as applied to the cathode-ray tube (CRT) 40. A first signal shaping portion 31 is connected to the video main amplifier 30 to shape a waveform of the amplified composite video signal as applied to the cathode-ray tube (CRT) and to feed the shaped composite video signal back to the video preamplifier and phase-locked loop (PLL) circuit 20 so as to establish a basis for comparison with an input external composite video signal from the external host computer or the image processing system through the cable connector 10.

A horizontal oscillation and phase-locked loop (PLL) circuit 50 is connected to the cable connector 10 to receive an input horizontal synchronization signal as supplied from the external host computer or the image processing system through the cable connector 10 and compare the same with a feedback horizontal synchronization signal as applied to a cathode-ray tube (CRT) 40 in order to detect a phase-difference therebetween and then generate, at its phase-difference output terminal PD, a second phase-difference signal representing a phase difference between the respective horizontal synchronization signals. A horizontal output circuit 60 is connected to the horizontal oscillation and phase-locked loop (PLL) circuit 60 to generate the horizontal synchronization signal to be applied to a cathode-ray tube (CRT) 40. A second signal shaping portion 61 is connected to the horizontal output circuit 60 to shape a waveform of the horizontal synchronization signal as applied to the cathode-ray tube (CRT) 40 and to feed the shaped horizontal synchronization signal back to the horizontal oscillation and phase-locked loop (PLL) circuit 50 in a form of a feedback horizontal synchronization signal so as to establish a basis for comparison with an input horizontal synchronization signal from the external host computer or the image processing system through the cable connector 10.

A vertical oscillation and phase-locked loop (PLL) circuit 70 is connected to the cable connector 10 to receive an input vertical synchronization signal as supplied from the external host computer or the image processing system and compare the same with a feedback vertical synchronization signal as applied to the cathode-ray tube (CRT) 40 in order to detect a phase difference therebetween, and then generate, at its phase-difference output terminal PD, a third phase-difference signal representing a phase difference between the respective vertical synchronization signals. A vertical output circuit 80 is connected to the vertical oscillation and phase-locked loop (PLL) circuit 70 to generate the vertical synchronization signal to be applied to the cathode-ray tube (CRT) 40. A third signal shaping portion 81 is connected to the vertical output circuit 80 to shape a waveform of the vertical synchronization signal as applied to the cathode-ray tube (CRT) 40 and to feed the shaped vertical synchronization signal back to the vertical oscillation and phase-locked loop (PLL) circuit 70 in a form of a feedback vertical synchronization signal so as to establish a basis for comparison with an input vertical synchronization signal from the external host computer or the image processing system through the cable connector 10.

A fourth signal shaping portion 81 is used to shape respective voltage levels generated from a switching mode power supply (SMPS) 90 which provides driving power supply to respective memory circuits incorporated in a video display device so as to establish a basis for comparison with an input external vertical synchronization signal from the external host computer or the image processing system through the cable connector 10. The switching mode power supply (SMPS) 90 provides three different voltage levels, i.e., 5 Volts, 12 Volts and 80 Volts from an external AC power supply for the microprocessor 100 to perform the self-diagnostic testing of a CRT video display.

A microprocessor 100 which includes an analog-to-digital (A/D) converter 101, an input/output device 102 and internal memory devices such as a read-only-memory (ROM) 103, a random-access-memory (RAM) 104 and an erasable programmable read-only-memory (EEPROM) 105, is electrically connected to the cable connector 10, the video preamplifier and phase-locked loop (PLL) circuit 20, the horizontal oscillation and phase-locked loop (PLL) circuit 50, and the vertical oscillation and phase-locked loop (PLL) circuit 70 to receive the vertical and horizontal synchronization signals from an external host computer or an image processing system, the first, second and third phase-difference signals, and the respective voltage levels supplied from the switching mode power supply (SMiPS) 90 for performing the self-diagnostic testing of the internal memory devices such as the ROM, RAM and EEPROM as well as the video preamplifier and phase-locked loop (PLL) circuit 20, the horizontal oscillation and phase-locked loop (PLL) circuit 50, and the vertical oscillation and phase-locked loop (PLL) circuit 70 to determine whether each of these internal circuits is functioning properly. A determined result is then transmitted to an external host computer or an image processing system for a visual display to inform an operator of the same.

Each phase-difference output terminal PD of the video preamplifier and PLL circuit 20, the horizontal oscillation and PLL circuit 50 and the vertical oscillation and PLL circuit 70, is linked to respective input terminals of an analog-to-digital AID converter 101 incorporated into the microprocessor 100. The voltage levels supplied from the switching mode power supply SMPS 90 are fed to respective input terminals of an analog-to-digital AID converter 102 incorporated in microprocessor 100 via the fourth signal shaping portion 91 for operation of the microprocessor 100. The analog-to-digital AID converter 101 as incorporated into the microprocessor 100 may be substituted with input/output devices. Microprocessor 100 also includes a well known interface standard, i.e., inter-integrated circuit I²C protocol, for data communication with the video preamplifier and PLL circuit 20, the horizontal oscillation and PLL circuit 50, the vertical oscillation and PLL circuit 70 and an external device such as a host computer or an image processing system via the cable connector 10. Moreover, at least one digital-to-analog D/A converter 101 is incorporated in each of the circuits as described above. As a result, the video preamplifier and PLL circuit 20, the horizontal oscillation and PLL circuit 50 and the vertical oscillation and PLL circuit 70 are subjected to control of the microprocessor 100. The microprocessor 100 transmits a control signal for controlling an output gain of the respective circuits and receives a data signal for the output gain from the respective circuit in response to the control signal. Data communication channel between microprocessor 100 and each of the video preamplifier and PLL circuit 20, the horizontal oscillation and PLL circuit 50 and the vertical oscillation and PLL circuit 70 is preferably constructed with a pair of signal lines for input and output.

As described above, the microprocessor 100 incorporates in its circuit design configuration a plurality of memory devices such as a read-only-memory (ROM) 103 for storing a sequence of digital test pattern from which a self-diagnostic test program can be conducted, a random-access-memory (RAM) 104 for temporarily storing program instructions and data when the self-diagnostic test program is executed, and an electrically erasable programmable read-only-memory (EEPROM) 105 for temporarily or permanently storing data.

Turning now to FIG. 2 which illustrates a typical phase comparator for use in a video preamplifier and PLL circuit 20, a horizontal oscillation and PLL circuit 50 and a vertical oscillation and PLL circuit 70 of the self-diagnostic circuit as shown in FIG. 1. At least one phase comparator COM is constructed in each of the video preamplifier and PLL circuit 20, the horizontal oscillation and PLL circuit 50 and the vertical oscillation and PLL circuit 70 to receive an input signal A from an external host computer or an image processing system through the cable connector 10 such as an input composite video signal consisting of R, G, B video components and an input horizontal and vertical synchronization signals, and a feedback signal B as applied from the first, second, third signal shaping portions 31, 61, 81 in order to compare a phase difference between the two respective input signals A and B and generate a respective phase-difference signal at its output terminal PD.

FIGS. 3A and 3B illustrate waveforms of respective input signals, and FIG. 3C illustrates a waveform of an output phase-difference signal of the phase comparator as shown in FIG. 2. Collectively, FIGS. 3A, 3B and 3C illustrate, for example, a determination of a phase-difference by a phase comparator COM between an input signal A which indicates one of an input composite video signal, a horizontal synchronization signal and a vertical synchronization signal generated from an external host computer or an image processing system for initiating the self-diagnostic testing of the respective video preamplifier and PLL circuit 20, the horizontal oscillation and PLL circuit 50 and the vertical oscillation and PLL circuit 70 and its respective feedback signal B in order to generate an output phase-difference signal as shown in FIG. 3C at a phase-difference output terminal PD.

FIG. 4 illustrates a format of one data frame for data transmission between the microprocessor 100 and the video preamplifier and PLL circuit 20, the horizontal oscillation and PLL circuit 50 and the vertical oscillation and PLL circuit 70, in which "S" represents a start condition field, a "S/A" represents a slave address field, a "R/W" represents a read/write field, "A1" represents a first acknowledge data field, "DATA1" represents a first data field, and "A2" represents a second acknowledge data field, and "DATA2" represents a second data field, "1" represents a data field and "P" represents a stop condition field When the microprocessor 100 communicates with the video preamplifier and PLL circuit 20, the horizontal oscillation and PLL circuit 50 and the vertical oscillation and PLL circuit 70, a data signal in a data format as shown in FIG. 4 is transmitted and received for determination of the proper operation status of the respective circuits.

Figure 5:
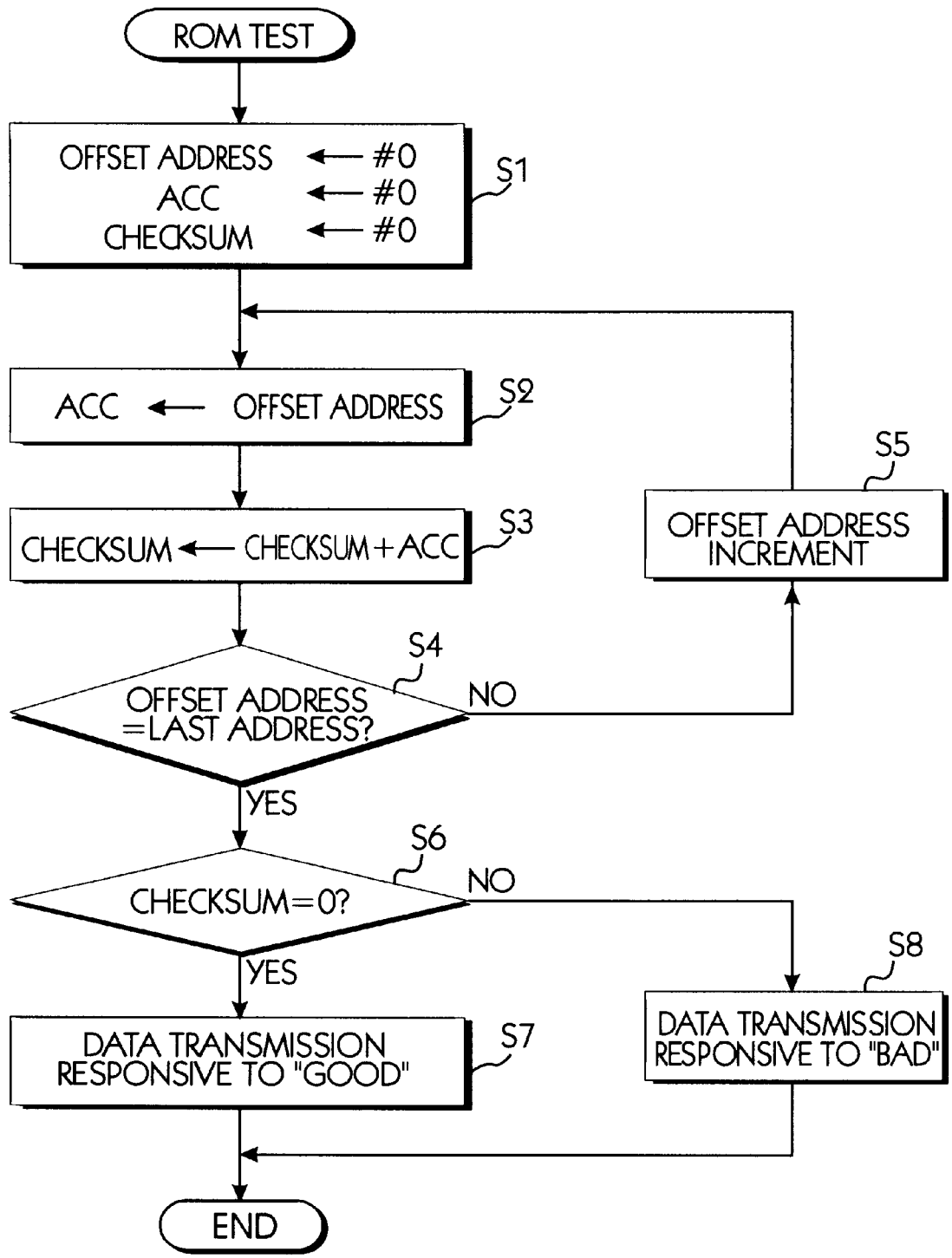
FIG. 5 is a flow chart illustrating a sequence of a process for testing a read-only-memory (ROM) in a microprocessor in accordance with one preferred embodiment of the present invention.

Refer now to FIG. 5 which illustrates a process for testing an internal memory device such as a read-only-memory (ROM) 103 in a microprocessor 100 in accordance with one preferred embodiment of the present invention. A self-diagnostic testing program as noted is stored in the ROM and is used by the microprocessor 100 to test whether such a ROM 103 is functioning properly. According to the testing procedure according to the preferred embodiment of the present invention, a total sum of data as sequentially written in discrete sequential addresses of a reserved area in a ROM is preset to "0". That is, it is first determined whether a checksum of data by collectively adding each and every data stored in a reserved area of a ROM 103, from an initial address location to a last address location of 8 bits or a byte, corresponds to a logical "0" indicating that the internal memory device such as a ROM 103 is functioning properly. However, if a single address location in a dedicated area of ROM 103 is not functioning properly, such a malfunction will impede and disrupt the proper operation of the microprocessor 100.

As shown in FIG. 5, the testing procedure for the ROM 103 begins with step S1, in which an offset address, an accumulator and a checksum data address are preset to "0", or are allocated to address "0". When the offset address, the accumulator and the checksum data address are set to "0"at step S1, data stored in the offset address is transferred to the accumulator at step S2. The checksum data is then incremented by the data stored in the accumulator at step S3. Once the checksum data is incremented by the data stored in the accumulator at step S3, the microprocessor 100 determines whether an offset address corresponds to the last address in a reserved area of a ROM 103 at step S4. If the offset address does not correspond to the last address of the ROM 103 at step S4, the offset address is incremented by a discrete value of a logical "1" at step S5, and the microprocessor 100 then returns to step S2 to transfer the data stored in the offset address to the accumulator to repeat the routine. If, on the other hand, the offset address corresponds to the last address of the ROM 103 at step S4, the microprocessor 100 determines whether the checksum is a logical "0" at step S6. If the checksum is determined to be a logical "0" indicating that the address locations of the ROM 103 are functioning properly or in proper working order, the microprocessor 100 generates a data signal to an external host computer or an image processing system via the cable connector 10 at step S7 to inform an operator that the ROM 103 is functioning properly. If, on the other hand, the checksum is determined not to be a logical "0" indicating that the address locations of the ROM 103 are not functioning properly, the microprocessor 100 generates another data signal to an external host computer or an image processing system via the cable connector 10 at step S8 to inform an operator that the ROM 103 is not functioning properly.

Figure 6:
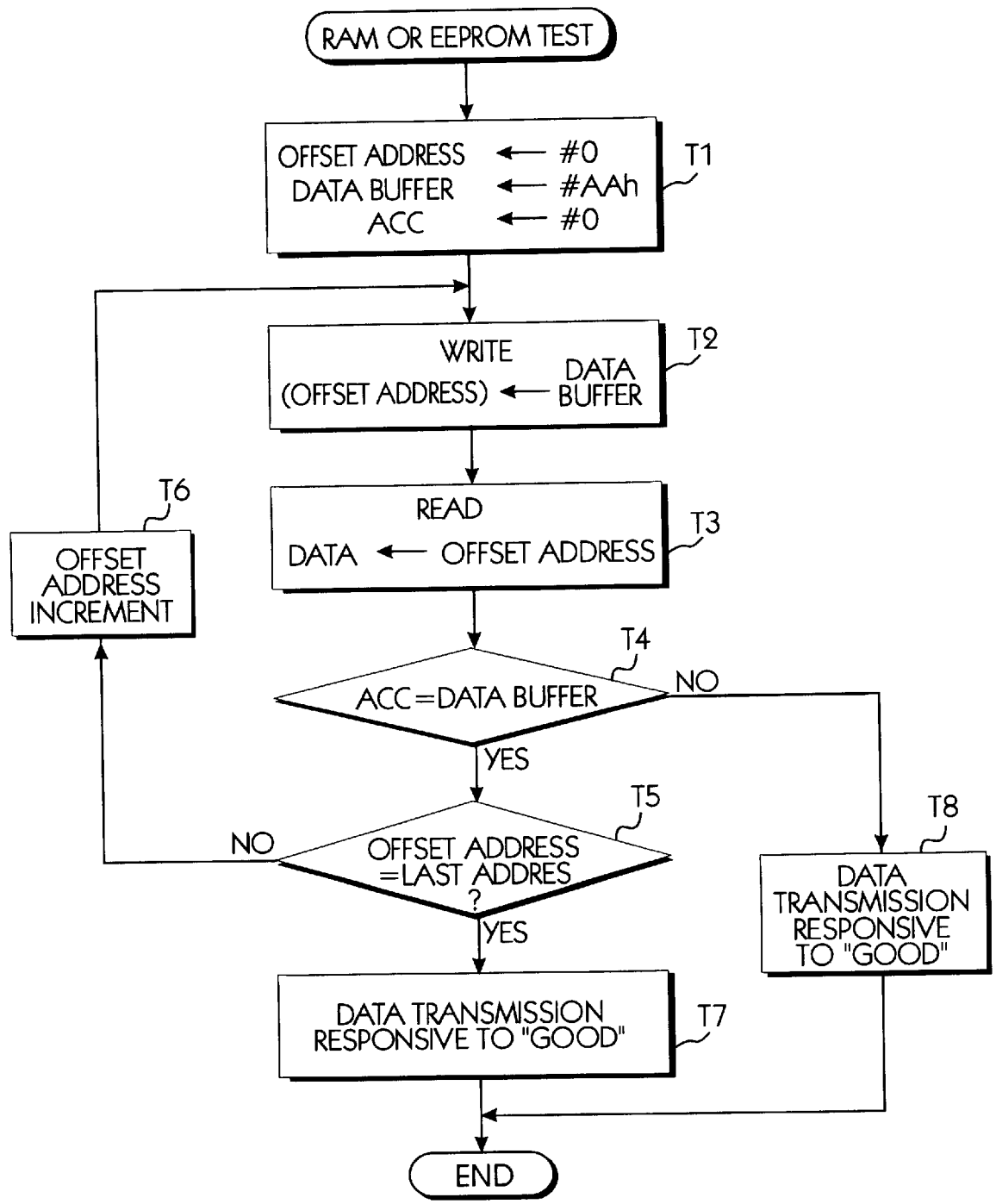
FIG. 6 is a flow chart illustrating a sequence of a process for testing either a random-access-memory (RAM) or an erasable programmable read-only-memory (EEPROM) in a microprocessor in accordance with another preferred embodiment of the present invention.

Turning now to FIG. 6 which illustrates a process for testing either a random-access-memory (RAM) 104 or an erasable programmable read-only-memory (EEPROM) 105 incorporated in a microprocessor 100 in accordance with another preferred embodiment of the present invention. The RAM 104, for example, contains a sequence of storage locations for temporarily storing data with each location having its own unique address. Any malfunction of even a single location in a dedicated area of the RAM 104 may cause a failure of the normal operation of the microprocessor 100. The EEPROM 105 contains similar storage locations for storing data either temporarily or permanently as necessary. As a result, the self-diagnostic testing scheme as contemplated by this particular arrangement requires that predetermined data must be first written into a reserved area of a RAM 104 or an EEPROM 105, and then the stored data be read out from the reserved area of one of the RAM 104 and the EEPROM 105 for the purpose of comparison with the original predetermined data in order to determine whether the RAM 104 or the EEPROM 105 is functioning properly.

As shown in FIG. 6, the testing procedure for a RAM 104 or an EEPROM 105 begins with step T1, in which an offset address and an accumulator are set to "0" at a first address location, and a data buffer is set to a predetermined value, for example, "AAh". When the offset address and the accumulator are set to "0" and the data buffer is set to the predetermined value at step T1, the microprocessor 100 writes data stored in the data buffer into an offset address location at step T2. After the data as stored in the data buffer is written into the offset address, such data as stored in the offset address is read out and is written into the accumulator at step T3. The microprocessor 100 then determines whether the data stored in the accumulator corresponds to the data stored in the data buffer at step T4. If the data stored in the accumulator corresponds to the data stored in the data buffer at step T4, the microprocessor 100 then determines that the offset address is the last address of either RAM 104 or EEPROM 105 at step T5. If the offset address is not the last address at step T5, however, the microprocessor 100 increments the offset address by a discrete value such as "1" at step T6, and returns to step T2 to repeat the testing routine. If, on the other hand, the offset address is determined to be the last address at step S5 indicating that the address locations of one of a RAM 104 and an EEPROM 105 are functioning properly or in proper operational order, the microprocessor 100 generates a data signal to an external host computer or an image processing system via the cable connector 10 to inform an operator that such internal memory device is functioning properly at step T7.

If the data stored in the accumulator does not correspond to the data stored in the data buffer at step T4, however, the microprocessor 100 determines that the address locations are malfunctioning and represent bad sectors, and then generates a data signal to an external host computer or an image processing system via the cable connector 10 to inform an operator that such internal memory device is malfunctioning at step T8.

The self-diagnostic circuit constructed according to the principles of the present invention and described above will now be explained in greater detail with reference to FIG. I through FIG. 5. The self-diagnostic circuit as shown in FIG. 1 is constructed as part of a video display device such as a CRT video display in order to test an operational status of internal hardware components within the CRT video display. The internal hardware components may be internal memory devices built-in a microprocessor 100 such as, a ROM 103, RAM 104 and EEPROM 105, as well as a video preamplifier and PLL circuit, a horizontal/vertical oscillation and PLL circuits and power supply circuits.

The internal hardware components as described above is sequentially tested by the self-diagnostic circuit, and the result is transmitted to an external host computer or an image processing system for recognition by an operator or a viewer. To perform the self-diagnosis testing operation of an internal memory device such as a ROM 103 built-in the microprocessor 100, a total sum of data as written into any address locations in the reserved area of the ROM 103 is set to a value of "0". The total sum of data of all address locations in the reserved area of the ROM 103 is obtained by adding up data values stored in such address locations as calculated by each discrete increment from the first address location to the last address location as contemplated by steps S1–S5 shown in FIG. 5. When the total sum of data obtained from all address locations in the reserved area of the ROM 103 corresponds to "0", the reserved area of the ROM 103 is determined to be in a proper working order, and in response thereto, the microprocessor 100 generates a status signal of a preset format of data frame conformed, for instance, to Inter-Integrated Circuit protocol to an external host computer or an image processing system to inform an operator or a viewer that such a ROM 103 is functional properly as contemplated by steps S6 and S7 shown in FIG. 5. Where the total sum of data as calculated does not correspond to the initially preset value of "0" which indicates that the ROM 103 is malfunctioning, the microprocessor 100 generates a corresponding status signal to an external host computer or an image processing system to inform an operator that such a ROM 103 is not functioning properly as contemplated by steps S6 and S8 shown in FIG. 5. As a result, a status signal output from the microprocessor 100 in a signal format of the Inter-Integrated Circuit Interface bus protocol is supplied to an external host computer or an image processing system via the cable connector 10 for a visual display in order to inform an operator the operational status of the ROM 103.

Separately, in order to perform a self-diagnostic test of other internal memory devices such as either a RAM 104 or an EEPROM 105 built-in the microprocessor 100, predetermined data must first be written into an address location in a reserved area of a RAM 104 or an EEPROM 105. The stored data is then read out from the same address location for a comparison with the input predetermined data as shown in steps T1–T4 of FIG. 6 in order to determine whether such address location is functional properly. If the stored data read out from an address location in the reserved area of either a RAM 104 or an EEPROM 105 corresponds to the input predetermined data, the microprocessor 100 proceeds in discrete increment to a next address location of either the RAM 104 or the EEPROM 105 until the last address in the reserved area of either the RAM 104 or the EEPROM 105 is determined as shown in step T2–T4 of FIG. 6. When the stored data from each address location corresponds to the input predetermined data for each discrete increment, the microprocessor 100 determines that the reserved area of either the RAM 104 or the EEPROM 105 is absolutely perfect and then generates a status signal corresponding thereto at its output terminal to an external host computer or an image processing system for a visual display to inform an operator of such a functional status as shown in steps T5–T7 of FIG. 6.

If any discrepancy is found in any address location of either the RAM 104 or the EEPROM 105, however, the microprocessor 100 determines that there is a malfunction in the memory device and generates a status signal corresponding thereto at its output terminal to an external host computer or an image processing system for a visual display to inform an operator of such malfunctional status as shown in steps T4 and T8 of FIG. 6. Accordingly, a signal output applied to an input terminal of an external host computer or an image processing system via cable connector causes the screen thereof to display the result of the testing in order to allow an operator to recognize the operational status of a RAM 104 or an EEPROM 105.

Microprocessor 100 generates a control signal in a format of single frame as shown in FIG. 4 to the video preamplifier and PLL circuit 20 for controlling an output gain (red R, green G and blue B gain) so as to check out the integrity of the video main amplifier 30. The control signal as described above controls the gain of an input composite video signal consisting of red R, green G and blue B video components. The microprocessor 100 also receives a response signal input from the video preamplifier and PLL circuit 20 to determine the operational status thereof, and then generates the result to an external host computer or an image processing system via the cable connector 10 for a visual display.

In addition, the microprocessor also generates another control signal in a format of single frame as shown in FIG. 4 to the horizontal oscillation and PLL circuit 50 so as to check out the integrity of the horizontal output circuit 60. The control signal as described above controls the gain of a horizontal output signal as supplied to the CRT display 40. The microprocessor 100 then receives a response signal from the horizontal oscillation and PLL circuit 50 to determine the operational status thereof, and generates the result to an external host computer or an image processing system via the cable connector 10 for a visual display.

To test the integrity of vertical output circuit 80, the microprocessor 100 generates a third control signal in a format of single frame as shown in FIG. 4 to the vertical oscillation and PLL circuit 70. The control signal as described above controls the gain of a vertical output signal as supplied to the CRT display 40. The microprocessor 100 then receives a response signal from the vertical oscillation and PLL circuit 70 to determine the operational status thereof, and then generates the result to an external host computer or an image processing system via the cable connector 10 for a visual display.

A composite video signal consisting of red R, green G and blue B video components generated from the video main amplifier 30 is fed back to an input terminal of the video preamplifier and PLL circuit 20 via a signal waveform shaping circuit, i.e., first signal shaping portion 31. At least one phase comparator COM or a plurality of phase comparators built-in the video preamplifier and PLL circuit 20 compares a feedback signal input as shown in FIG. 3B with respective red R, green G and blue B video component signals as shown, for example, in FIG. 3A in order to generate a phase-difference signal as shown in FIG. 3C at its phase-different output terminal PD. The phase-difference signal is then transmitted to the input/output device 101 built-in the microprocessor 100. As a result, the microprocessor 100 controls the integrity of the composite video signal as applied to the CRT display 40, determines the operational status of each video circuits including the video preamplifier and PLL circuit 20 and the video main amplifier 30 by way of an input phase-difference signal and generates a status signal corresponding to the operational status of such video circuits to an external host computer or an image processing system via the cable connector 10 for a visual display to inform an operator of the same.

A horizontal signal output from the horizontal output circuit 60 is also fed back to an input terminal of the horizontal oscillation and PLL circuit 50 via a signal waveform shaping circuit, i.e. signal shaping portion 61. A phase comparator COM as built-in the horizontal oscillation and PLL circuit 50 compares a feedback horizontal signal with a horizontal synchronization signal HSYNC input from the cable connector 10, determines a phase difference between the respective horizontal synchronization signals, then generates a phase difference signal at its output terminal PD to an input/output device 101 of the microprocessor 100. As a result, the microprocessor 100 determines the operational status of the horizontal circuits including the horizontal oscillation and PLL circuit 50 and the horizontal output circuit 60 by way of a phase difference signal, and then transmits a status signal corresponding thereto to an external host computer or an image processing system via the cable connector 10 for a visual display to inform an operator of the same.

Similarly, a vertical signal output from the vertical output circuit 80 is also fed back to an input terminal of the vertical oscillation and PLL circuit 70 via a signal waveform shaping circuit, i.e. signal shaping portion 81. A phase comparator COM as built-in the vertical oscillation and PLL circuit 70 compares a feedback vertical signal with a vertical synchronization signal VSYNC input from the cable connector 10, determines a phase difference between the respective vertical synchronization signals, then generates a phase difference signal at its output terminal PD to an input/output device 101 of the microprocessor 100. As a result, the microprocessor 100 determines the operational status of the vertical circuits including the vertical oscillation and PLL circuit 70 and the vertical output circuit 80 by way of a phase difference signal, and then transmits a status signal corresponding thereto to an external host computer or an image processing system via the cable connector 10 for a visual display to inform an operator of the same.

Respective voltage at different level applied at a plurality of output terminals of switching mode power supply SMPS 90 is Subjected to voltage drop in the signal shaping portion 91 so that a voltage supply at a predetermined level is fed to the input/output device 102 of the microprocessor 100. Then microprocessor 100 determines the operational status of SMPS 90 responsive to the input voltage level. When the level of any of voltage supply input is found to be outside of a predetermined range, microprocessor 100 determines that the SMPS 90 is not functioning properly, and concomitantly generates a status signal corresponding thereto to an external host computer or an image processing system via the cable connector 10 for a visual display of the same.

As described in the foregoing a self-diagnostic circuit as constructed according to the principles of the present invention effectively performs self-diagnostic testing of individual hardware components within a CRT video display and efficiently informs an operator of an operational status of either a CRT video display or individual hardware components driving such the CRT video display by way of an external host computer or an image processing system connected thereto. As a result, the self-diagnostic circuit constructed according to the present invention is able to effectively inform an operator of any malfunctioning occurring in either a CRT video display or its internal hardware components such as its internal memory devices as well as other video driving circuits.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A self-diagnostic circuit for a video display device having a monitor and a cable connector for connecting the self-diagnostic circuit to an external system via a cable, said self-diagnostic circuit comprising:

microprocessor means comprising a first memory for storing a self-diagnostic program, a second memory for temporarily storing test data generated from said self-diagnostic program and a third available memory;

video preamplifier and phase-locked loop means for comparing input video component signals received from said cable connector with respective video component signals being applied to the monitor, detecting phase differences therebetween, and then generating a first phase-difference signal and the respective video component signals;

first signal shaping means for shaping a waveform of the video component signals and for feeding back the shaped video component signals to said video preamplifier and phase-locked loop means;

horizontal oscillation and phase-locked loop means for comparing an input horizontal synchronization signal received from said cable connector with a horizontal synchronization signal being applied to said monitor, detecting a phase difference therebetween, and then generating a second phase-difference signal;

second signal shaping means for shaping a waveform of the horizontal synchronization signal and for feeding back the shaped horizontal synchronization signal to said horizontal oscillation and phase-locked loop means;

vertical oscillation and phase-locked loop means for comparing an input vertical synchronization signal received via said cable connector with a vertical synchronization signal being applied to said monitor, detecting a phase difference therebetween, and then generating a third phase-difference signal;

third signal shaping means for shaping a waveform of the vertical synchronization signal and for feeding back the shaped vertical synchronization signal to said vertical oscillation and phase-locked loop means;

fourth signal shaping means for shaping a waveform of respective output voltages from a power supply to respective first, second and third memories of said microprocessor means; and said microprocessor means coupled to receive said input horizontal and vertical synchronization signals received from said cable connector, said respective output voltages from said fourth signal shaping means, and said first, second and third phase-difference signals generated from said video preamplifier and phase-locked loop means, said horizontal oscillation and phase-locked loop means and said vertical oscillation and phase-locked loop means, for determining the operational status of respective first, second and third memories in dependence upon operation of said self-diagnostic program to generate testing data to said cable connector.

2. The self-diagnostic circuit of claim 1, further comprised of said video preamplifier and phase-locked loop means including at least three phase comparators.

3. The self-diagnostic circuit of claim 1, further comprised of said horizontal oscillation and phase-locked loop means including at least a single phase comparator.

4. The self-diagnostic circuit of claim 1, further comprised of said vertical oscillation and phase-locked loop means including at least a single phase comparator.

5. The self-diagnostic circuit of claim 1, further comprised of said microprocessor means including an analog-to-digital converter for converting said first, second and third phase-difference signals into a digital format, a read-only-memory as said first memory for storing said self-diagnostic program, a random-access-memory as said second memory, and an erasable programmable read-only-memory.

6. The self-diagnostic circuit of claim 5, further comprised of said analog-to-digital converter being constructed as an input/output device for said microprocessor means.

7. The self-diagnostic circuit of claim 1, further comprised of said microprocessor means receiving respective phase-difference signals generated by said video preamplifier phase-locked loop means, said horizontal oscillation and phase-locked loop means and said vertical oscillation and phase-locked loop means for determining an operational status of the respective preamplifier phase-locked loop means, said horizontal oscillation and phase-locked loop means and said vertical oscillation and phase-locked loop means.

8. The self-diagnostic circuit of claim 1, further comprised of each of said video preamplifier and phase-locked loop means, said horizontal oscillation and phase-locked loop means, and said vertical oscillation and phase-locked loop means incorporating at least a digital-to-analog converter for the transmission of an output gain thereof to said microprocessor means.

9. The self-diagnostic circuit of claim 1, further comprised of said microprocessor means utilizing a data format of one frame consisting of starting state, slave address, read/write beat, first acknowledge, first data, second acknowledge second data, data, and stop state, as communication protocol, during data transmission with each of said video preamplifier and phase-locked loop means, said horizontal oscillation and phase locked loop means and said vertical oscillation and phase-locked means.

10. A circuit for a video display device having a cable connector connecting to a cable of an external system, wherein a video signal applied at an output terminal of said cable connector is supplied to a cathode ray tube via a video preamplifier and phase-locked loop circuit and a video main amplifier connected in series, a horizontal/vertical synchronization signal applied at said output terminal of said cable connector is supplied to said cathode ray tube via a horizontal oscillation and phase-locked loop circuit and a horizontal output circuit connected in series, and a vertical oscillation and phase-locked loop circuit and a vertical output circuit connected in series, respectively, a power supply applied from an external power source is supplied to respective circuits of said video display device at a predetermined voltage level by an operation of voltage drop in a switching mode power supply to energize said respective circuits, said circuit comprising:

a first signal waveforn shaping portion for shaping a signal output from said video main amplifier, and then feeding back the shaped signal to an input terminal of said video preamplifier and phase-looked loop circuit thereby enabling said shaped signal to establish a comparison with a video signal input from said cable connector;

a second signal waveform shaping portion for shaping a signal output from said horizontal output circuit, and then feeding back the shaped signal to an input terminal of said horizontal oscillation and phase-locked loop circuit thereby enabling said shaped signal to establish a comparison with a horizontal synchronization signal -input from said cable connector;

a third signal waveform shaping portion for shaping a signal output from said vertical output circuit, and then feeding back the shaped signal to an input terminal of said vertical oscillation and phase-locked loop circuit thereby enabling said shaped signal to establish a comparison with a vertical synchronization signal input from said cable connector;

a fourth signal waveform shaping portion for shaping respective voltage waveforms supplied from said switching mode power supply; and a microprocessor for demanding information for output gain and receiving said information and a phase difference signal from respective said video preamplifier and phase-locked loop circuit, said horizontal oscillation and phase-locked loop circuit, and said vertical oscillation and phase-locked loop circuit, for determining an operational status of respective said video preamplifier and phase-locked loop circuit, said horizontal oscillation and phase-locked loop circuit, and said vertical oscillation and phase-locked loop circuit, and for detecting a power supply signal input via said fourth signal waveform shaping portion, and then generating the result to said external system via said cable connector.

11. The circuit of claim 10, further comprised of said microprocessor incorporating an analog-to-digital converter and memory devices including a read-only-memory, a random-access-memory and an electrically erasable programmable read-only-memory.

12. The circuit of claim 11, further comprised of said analog-to-digital converter being used as an input/output device for said microprocessor.

13. The circuit of claim 10, further comprised of said microprocessor being fed with a phase difference signal output from respective said video preamplifier and phase-locked loop circuit, said horizontal oscillation and phase-locked loop circuit, and said vertical oscillation and phase-locked loop circuit via either an analog-to-digital converter or an input/output device, and is also fed with a voltage signal output from said fourth signal waveform shaping portion.

14. The circuit of claim 10, further comprised of said microprocessor utilizing a format of one frame for communication protocol consisting of starting state, slave address, read/write beat, first acknowledge, first data, second acknowledge, second data, data and stop state during bidirectional data transmission with respective said video preamplifier and phase-locked loop circuit, said horizontal oscillation and phase-locked loop circuit, and said vertical oscillation and phase-locked loop circuit.

15. A method for self-diagnosis testing one of a random-access-memory and an electrically erasable programmable read-only-memory built-in a microprocessor for controlling operation of a video display device, said method comprising the steps of:

a first process for recording preset data in an address location of a reserved area of a selected one of said random-access-memory and said electrically erasable programmable read-only-memory, reading out stored data from said address location, and making a comparison of said stored data with said preset data to determine whether said selected one of said random-access-memory and said electrically erasable programmable read-only-memory is normal;

a second process for repeatedly performing said first process by incrementing by each address location until a last address location of said reserved area in said selected one of said random-access-memory and said electrically erasable programmable read-only-memory;

a third process for determining that said reserved area of said selected one of said random-access-memory and said electrically erasable programmable read-only-memory is normal when said comparison indicates that said stored data read from said address location corresponds to said preset data during a time period of said second process, and then outputting a data signal to a host computer system to inform an operator of such normality of said selected one of said random-access-memory and said electrically erasable programmable read-only-memory; and a fourth process for determining that said reserved area of said selected one of said random-access-memory and said electrically erasable programmable read-only-memory is abnormal when said comparison indicates that said stored data read from said address location does not correspond to said preset data during said time period of said second process, and then outputting a different data signal to said host computer system to inform the operator of such abnormality of said selected one of said random-access-memory and said electrically erasable programmable read-only-memory.

* * * * *